US009225879B2

(12) United States Patent
Kappeler et al.

(10) Patent No.: US 9,225,879 B2
(45) Date of Patent: Dec. 29, 2015

(54) METHOD AND APPARATUS FOR VIDEO SEQUENTIAL ALIGNMENT

(71) Applicant: TCL RESEARCH AMERICA INC., Santa Clara, CA (US)

(72) Inventors: Armin Kappeler, Santa Clara, CA (US); Haiguang Li, Santa Clara, CA (US); Michail Iliadis, Santa Clara, CA (US); Haohong Wang, Santa Clara, CA (US)

(73) Assignee: TCL RESEARCH AMERICA INC., Santa Clara, CA (US)

( * ) Notice: Subject to any disclaimer, the term of this patent is extended or adjusted under 35 U.S.C. 154(b) by 140 days.

(21) Appl. No.: 14/142,235

(22) Filed: Dec. 27, 2013

(65) Prior Publication Data

US 2015/0189193 A1 Jul. 2, 2015

(51) Int. Cl.
G06K 9/32 (2006.01)
H04N 5/14 (2006.01)
G06T 7/00 (2006.01)
(52) U.S. Cl.
CPC ............. *H04N 5/144* (2013.01); *G06T 7/0038* (2013.01)
(58) Field of Classification Search
None
See application file for complete search history.

(56) References Cited

U.S. PATENT DOCUMENTS

| 6,671,669 | B1* | 12/2003 | Garudadri et al. | 704/255 |
|---|---|---|---|---|
| 6,751,354 | B2* | 6/2004 | Foote et al. | 382/224 |
| 7,747,103 | B2* | 6/2010 | Iizuka | 382/278 |
| 7,904,410 | B1* | 3/2011 | Andrade-Cetto | 706/48 |
| 8,370,869 | B2* | 2/2013 | Paek et al. | 725/19 |
| 2007/0245242 | A1* | 10/2007 | Yagnik | 715/721 |
| 2007/0286528 | A1* | 12/2007 | Podilchuk | 382/305 |
| 2008/0253689 | A1* | 10/2008 | Ferguson | 382/294 |
| 2009/0263014 | A1* | 10/2009 | Zhang et al. | 382/165 |
| 2011/0311135 | A1* | 12/2011 | Chupeau et al. | 382/165 |
| 2012/0213429 | A1* | 8/2012 | Vasudevan et al. | 382/162 |

OTHER PUBLICATIONS

Salvador, S. and Chan, P. (2004) FastDTW: Toward accurate dynamic time warping in linear time and space. 3rd Wkshp. on Mining Temporal and Sequential Data, ACM KDD '04. Seattle, Washington (Aug. 22-25, 2004).*
Bhatt et al, Concept-based near-duplicate video clip detection for novelty re-ranking of web video search results, Multimedia Systems (2012) 18:337-358.*
Ho et al, Fast Coarse-to-Fine Video Retrieval Using Shot-Level Spatio-Temporal Statistics, IEEE Transactions on Circuits and Systems for Video Technology, vol. 16, No. 5, May 2006.*
Z. Droueche, Content-Based Medical Video Retrieval Based on Region Motion Trajectories, 5th European Conference of the International Federation for Medical and Biological Engineering IFMBE Proceedings vol. 37, 2012, pp. 622-625.*

* cited by examiner

*Primary Examiner* — Andrae S Allison
(74) *Attorney, Agent, or Firm* — Anova Law Group, PLLC

(57) ABSTRACT

A method for video sequential alignment is provided. The method includes inputting a first video sequence and a second video sequence, and extracting features of the first video sequence and the second video sequence. The method also includes generating an expanded path using a hierarchical sequential alignment algorithm and generating masks containing search space using keyframe matching. Further, the method includes calculating the lowest path cost within search space to find a minimal alignment path using a block A* algorithm and outputting a final alignment result after applying the block A* algorithm to search space.

20 Claims, 8 Drawing Sheets

(a)

(b)

(c)

(d)

(e)

(f)

METHOD AND APPARATUS FOR VIDEO SEQUENTIAL ALIGNMENT

FIELD OF THE INVENTION

The present invention generally relates to video processing technologies and, more particularly, to methods and apparatuses for video sequential alignment.

BACKGROUND

Nowadays, video sequential alignment has shown great value in many video applications such as scene detection, content monitoring, and so on. The alignment of two sequences can be seen as a path finding problem through a cost matrix. That is, the alignment of the two sequences can be converted to find a path from the lower left corner to the upper right corner. Each dimension represents the frame features of one sequence.

Traditional approaches use dynamic time warping (DTW) algorithms (e.g., Needleman-Wunsch global sequence alignment algorithm, Dijkstra's algorithm, etc.) to align such two time sequences. That is, the DTW algorithms are used to find the possible alignment of two sequences which may differ in some parts. For example, a Needleman-Wunsch global sequence alignment algorithm performs global alignment on two sequences and finds the alignment with the maximum score. But these algorithms consume excessive time and memory resources when the sequences become large, as the complexity of the problem is given as O(NM), where N and M are the dimension of the matrix. Therefore, these approaches have a quadratic time and space complexity that limits its use to small time series.

The disclosed method and apparatus are directed to solve one or more problems set forth above and other problems.

BRIEF SUMMARY OF THE DISCLOSURE

One aspect of the present disclosure includes a method for video sequential alignment. The method includes inputting a first video sequence and a second video sequence, and extracting features of the first video sequence and the second video sequence. The method also includes generating an expanded path using a hierarchical sequential alignment algorithm and generating masks containing search space using keyframe matching. Further, the method includes calculating the lowest path cost within search space to find a minimal alignment path using a block A* algorithm and outputting a final alignment result after applying the block A* algorithm to search space.

Another aspect of the present disclosure includes an apparatus for video sequential alignment. The apparatus includes an input video sequence module configured to provide a first video sequence and a second video sequence from any appropriate type of source for video contents and a feature extraction module configured to extract the feature vectors of the first video sequence and the second video sequence. The apparatus also includes a hierarchical sequential alignment (HSA) module configured to generate an expanded path using a hierarchical sequential alignment algorithm and a keyframe matching module configured to generate masks containing search space. Further, the apparatus includes a calculation module configured to calculate the lowest path cost within search space to find a minimal alignment path using a block A* algorithm and an output module configured to output a final alignment result after applying the block A* algorithm to the search region.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
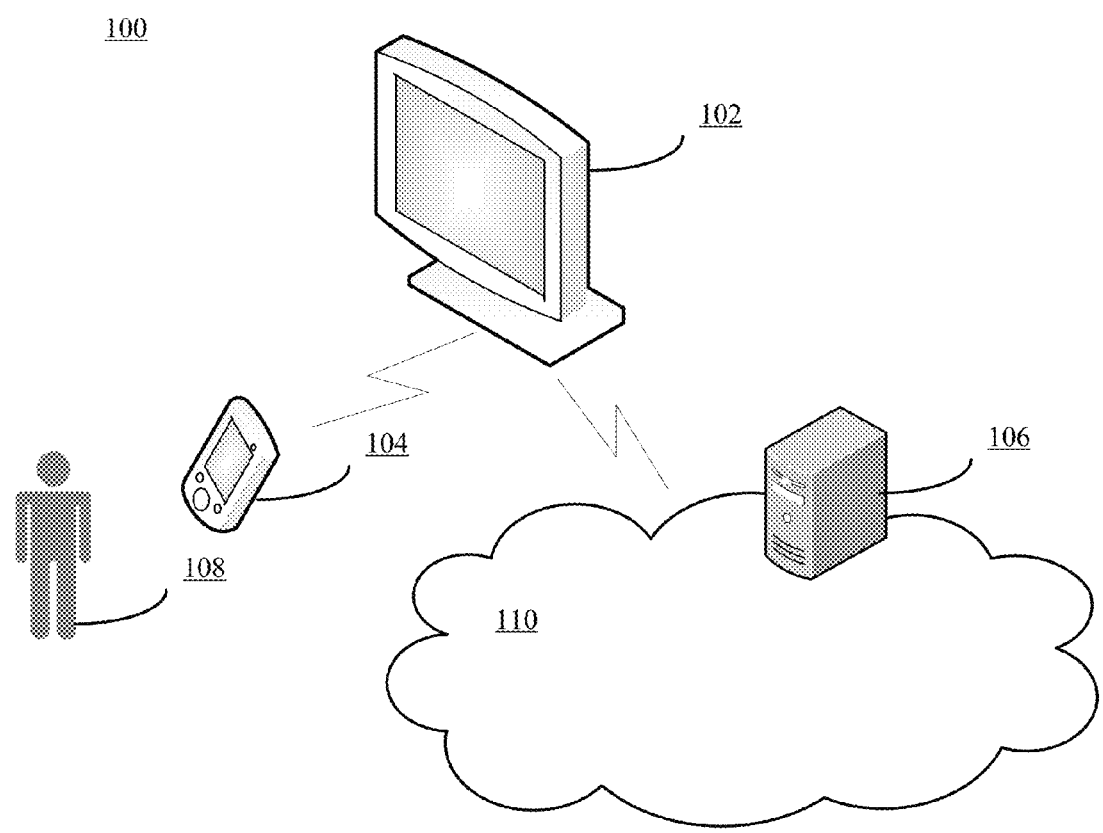
FIG. 1 illustrates an exemplary environment incorporating certain embodiments of the present invention.

FIG. 1 illustrates an exemplary environment 100 incorporating certain embodiments of the present invention. As shown in FIG. 1, environment 100 includes a television set (TV) 102, a remote control 104, and a user 108. Optionally, environment 100 may include a network device 106.

TV 102 may include any appropriate type of TV, such as plasma TV, LCD TV, projection TV, non-smart TV, or smart TV. TV 102 may also include other computing system, such as a personal computer (PC), a tablet or mobile computer, or a server, etc.

Remote control 104 may include any appropriate type of remote control that communicates with and controls the TV 102, such as a customized TV remote control, a universal remote control, a tablet computer, a smart phone, or any other computing device capable of performing remote control functions. Remote control 104 may also include other types of devices, such as a motion-sensor based remote control, or a depth-camera enhanced remote control, as well as simple input/output devices such as keyboard, mouse, and voice-activated input device, etc. When TV 102 is a PC or other type of computer, the remote control 104 may be omitted.

To watch TV 102 and to perform an activity of interest, such as shopping or watching or editing a video program, on TV 102, the user 108 may first pick up the remote control 104, hold the remote control 104, and then use the remote control 104 to control TV 102 to perform the activity of interest, or the user may simply use hand or body gestures to control TV 102 if motion sensor or depth-camera is used. During this process, the user 108 may interact with the TV 102 and/or network device 106.

Further, the optional network device 106 may include any appropriate type of computing or consumer electronic device to facilitate the communication, data storage, and data processing between the remote control 104 and TV 102. TV 102, remote control 104, and network device 106 may communicate with each other through one or more communication networks.

Figure 2:
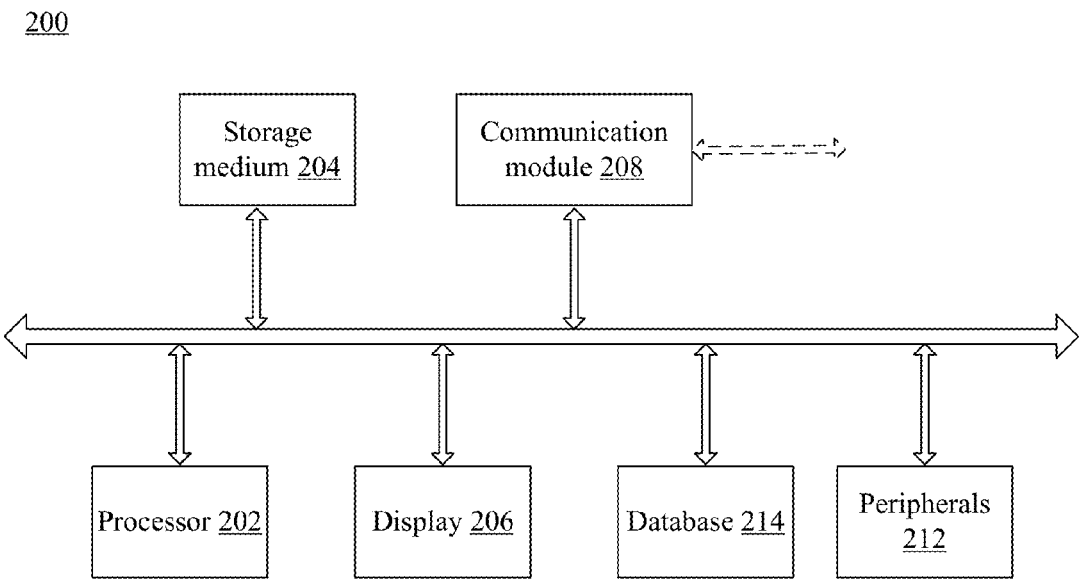
FIG. 2 illustrates an exemplary computing system consistent with the disclosed embodiments.

TV 102, remote control 104, and/or network device 106 may be implemented on any appropriate computing circuitry platform. FIG. 2 shows a block diagram of an exemplary computing system 200 capable of implementing TV 102, remote control 104, and/or network device 106.

As shown in FIG. 2, computing system 200 may include a processor 202, a storage medium 204, a monitor 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 210 may include one or more databases for storing certain data and for performing certain operations on the stored data, such as database searching.

Figure 3:
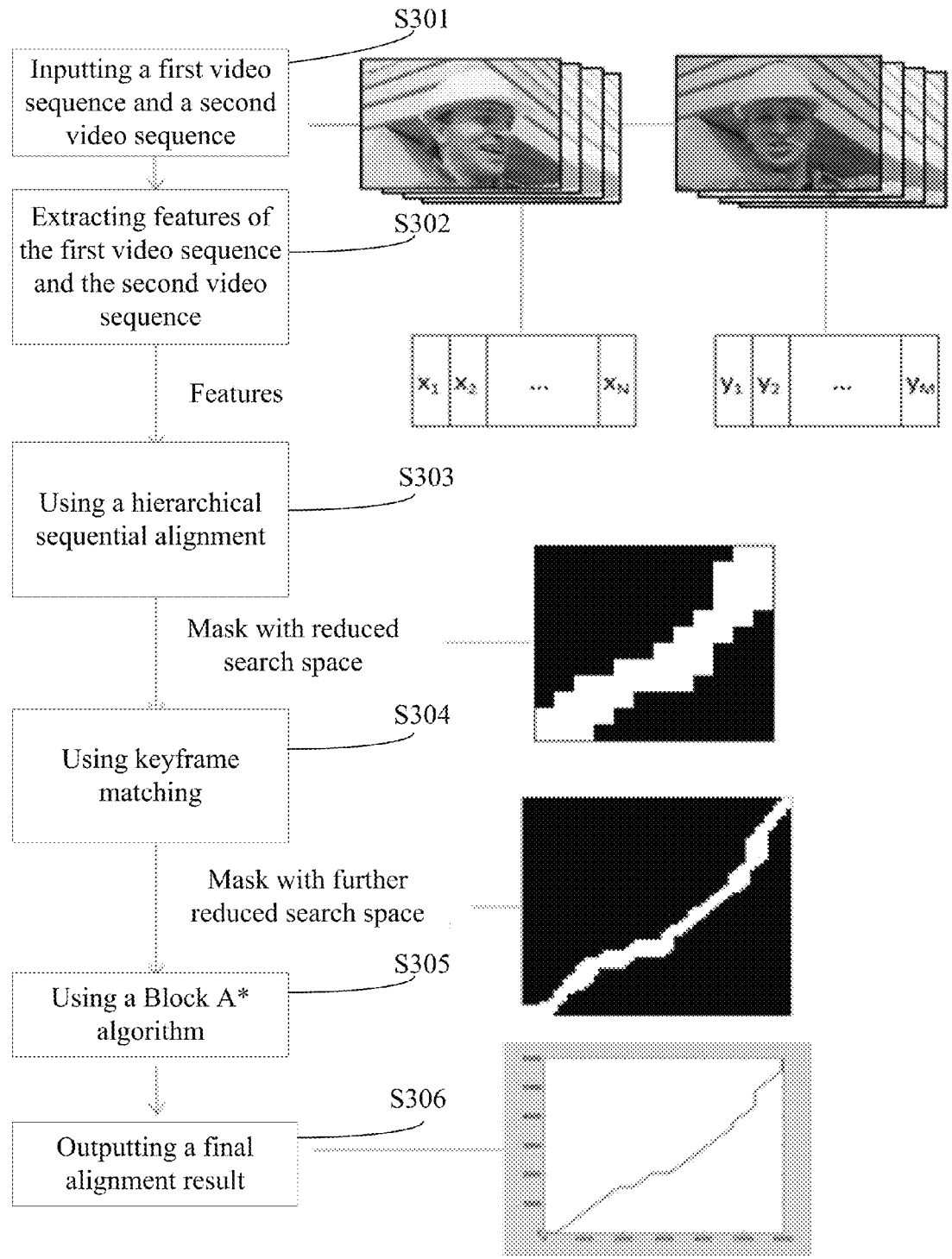
FIG. 3 illustrates a flow chart of an exemplary video sequential alignment process consistent with the disclosed embodiments.

In operation, TV 102 and/or network device 106 may implement a video analyzing process for searching, comparing, and/or editing a video sequence inputted into TV 102. FIG. 3 illustrates a flow chart of an exemplary video sequential alignment process consistent with the disclosed embodiments.

As shown in FIG. 3, at the beginning, a first video sequence and a second video sequence are inputted (S301). The two video sequences may be from any appropriate type of source for video contents. The contents from the input video sequences may include both video data and metadata. Plurality of frames may be associated with the video content and may be provided to other modules for processing.

Further, features of the first video sequence and the second video sequence are extracted (S302). The features are extracted from every frame of two videos X and Y. Every feature can be vectorized to a constant length vector. The L1-norm is used as the feature similarity, which is defined by:

$$\text{cost}(x_n, y_m) = |x_n - y_m|, \quad (1)$$

where $x_n$ and $y_m$ represent the feature vectors of the n-th frame of video X, and the m-th frame of video Y, respectively.

After obtaining the features of the two video sequences, an expanded path may be generated using a hierarchical sequential alignment algorithm (S303).

Figure 4:
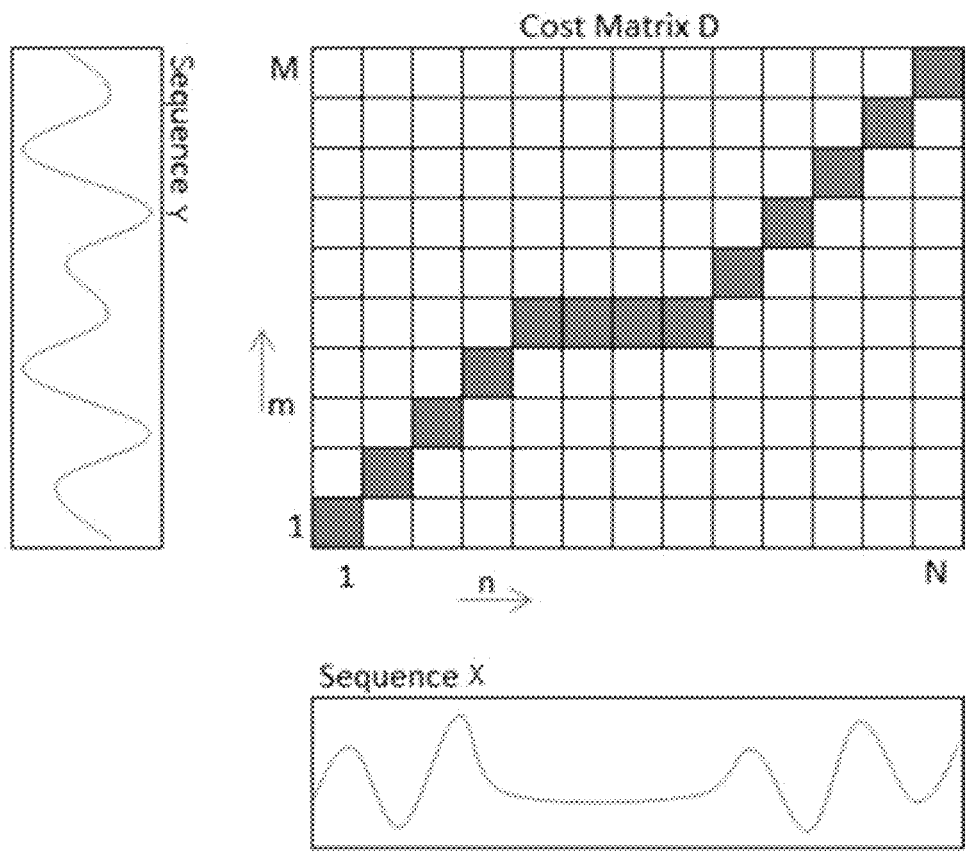
FIG. 4 illustrates an exemplary cost matrix of two sequences consistent with the disclosed embodiments.

FIG. 4 illustrates an exemplary cost matrix of two sequences with the minimum-distance warp path. As shown in FIG. 4, assuming that $X=[x_1, x_2, \ldots x_N] \in R^{1 \times M}$ and $Y=[y_1, y_2, \ldots y_M] \in R^{1 \times N}$ are two time sequences, where N and M are the length of the two time sequences X and Y. For the alignment of the sequences X and Y, a cost matrix D with the dimensions N×M is created. A path (grey blocks) is shown from the lower left corner to the upper right corner of the matrix. In the video sequence alignment problem, each element of the time sequences contains the features of one image, stacked in one vector of length 1. Each element d(n,m) of D is calculated as cost($x_n, y_m$), where the function cost can represent any distance measure (Euclidean distance etc.); n is an index from the time sequence X; and m is an index from the time sequence Y. In order to align the two sequences, the sum of the used matrix fields is defined by:

$$J = \min \sum_{(n,m) \in p} d(n, m) \quad (2)$$

The path is constrained by the following three conditions:
1. Boundary condition: with $p_k$ as the last element of the path, the start cell $p_1=(1,1)$ and the end cell $p_k=(n,m)$ of the path are defined.
2. Continuity: the path is only allowed to move to a neighboring field.
3. Monotonicity: the path has to resemble a monotonically increasing curve. Therefore, the path can never move in a negative direction (horizontally or vertically).

Following from condition 2 and 3, the movement steps are restricted to positive horizontal, vertical or diagonal movements to neighboring fields, which can defined as $\{(1,0)(0,1)(1,1)\}$.

To find the possible path, dynamic programming is used. For a new matrix, the elements of the matrix g(n,m) contain the cost of the optimal path from the start node to the point (n,m). From the first element on the bottom left, each element of G is calculated by:

$$g(n,m) = d(n,m) + \min\{g(n-1,m), g(n-1,m-1), g(n,m-1)\} \quad (3)$$

The value at the top right element of the matrix G corresponds to the alignment cost. The alignment path in a video sequence alignment problem can move in three different directions (i.e., vertical, horizontal and diagonal). A diagonal movement corresponds to a match. A vertical or horizontal movement corresponds to an insertion or a deletion of frames, and there is no match available in the videos for these frames. Instead of using the values d(n,m−1) or d(n−1,m) for a non-diagonal movement, d(n,m−1) or d(n−1,m) is replaced by a constant penalty W. Therefore, the new cost function is defined by:

$$g(n,m) = \min\{g(n-1,m)+W, g(n-1,m-1)+d(n,m), g(n,m-1)+W\} \quad (4)$$

The complexity of DTW is O(NM). A general DTW structure with additional cost functions is defined by:

$$g(n,m) = \lambda + d(n,m) + \begin{cases} 0 & \text{if } n = m = 1 \\ g(n, m-1) + \delta & \text{if } n = 1 \\ g(n-1, m) + \delta & \text{if } m = 1 \\ \min \begin{cases} g(n-1, m) + \delta, \\ g(n-1, m-1), \\ g(n, m-1) + \delta. \end{cases} & o.w. \end{cases} \quad (5)$$

Based on the optimal structure (Formula 5), the corresponding general sequential alignment (SA) algorithm is shown in Algorithm 1.

Algorithm 1: SA: Sequential Alignment

```
Input:   λ    Penalty per move λ ∈ ℝ⁺
         δ    Penalty per non-diagonal move δ ∈ ℝ⁺
         F    Cost or distance norm F ∈ ℤ⁺
         X    The target sequence with length |X| ∈ ℤ⁺
         Y    The candidate sequence with length |Y| ∈ ℤ⁺
Output:  Cost & Path
1    if |X| = 1 ∧ |Y| = 1 then
2    |    <c, p> ← <0, ∅>
3    else if |X| = 1 then
4    |    <c, p> ← SA(X, Y[1:|Y| − 1]) + <δ, ∅>
5    else if |Y| = 1 then
6    |    <c, p> ← SA(X[1:|X| − 1], Y) + <δ, ∅>
7    else
8    |    X' ← X[1: |X| − 1]
9    |    Y' ← Y[1: |Y| − 1]
10   |    <c, p> ← min_c { SA(X', Y) + <δ, φ>,
                            SA(X', Y'),
                            SA(X, Y') + <δ, φ> }
11   Cost ← λ + ||X[|X|] − Y[|Y|]||_F² + c
12   Path ← {<|X|, |Y|>} ∪ p
13   return <Cost, Path>
```

The quadratic time and space complexity limit the traditional sequential alignment algorithm's applications on large-scale data. An accelerated sequential alignment algorithm is used by combining the constraints and the data abstraction to yield linear time and space complexities. The number of $g(\cdot,\cdot)$ is limited to be carried out by adding certain constraints. The representation of the data is reduced, and then the sequential alignment algorithm is applied.

Algorithm 2: HSA: Hierarchical Sequential Alignment

```
Input:   r    Search radius r ∈ ℤ⁺
         X    The target sequence with length |X| ∈ ℤ⁺
         Y    The candidate sequence with length |Y| ∈ ℤ⁺
Output:  Cost & Path
1    minLength ← r + 2
2    if min {|X|, |Y|} > minLength then
3    |    X' ← Shrink(X)
4    |    Y' ← Shrink(Y)
5    |    < c', p' > ← HSA(X', Y', r)
6    |    p ← ExpandPath(p', X, Y, r)
7    |    < Cost, Path > ← SA(X, Y, p)
8    else
9    |    < Cost, Path > ← SA(X, Y)
10   return < Cost, Path >
```

The hierarchical sequential alignment (HSA) algorithm is shown in Algorithm 2.

First, the original sequences are recursively shrunk into a lower resolution (data abstraction) if the minimal length of the two sequences X and Y is longer than minLength. Shrink(•) reduces the resolution by half, and several strategies can be adopted such as geometric mean, arithmetic mean, and summation.

Second, the alignment path p' at the lower resolution X' and Y' is found.

Third, the lower resolution path p' is expanded as a constraint path window in the original resolution. ExpandPath(•,•,•,•) expands the lower resolution path to normal resolution and enlarges the path window by r. The path is doubled with straight lines, and each point within radius r of the expanded path is also included in the expanded path window.

Finally, the original sequential alignment algorithm is used for aligning in the constraint path window.

It should be noted that the radius r may be adaptive rather than a constant. SA(•,•) does not support constraint window originally. However, it is able to be easily supported by checking whether (i,j) is in the search window or not before calculating opt(i,j), opt(i,j)←−∞ if (i,j)∉ constraint window, where i is an index from the time sequence X, and j is an index from the time sequence Y.

The HSA algorithm can calculate the alignment of the full sequence by itself. Due to the heuristic nature of the algorithm and in order to reduce the overhead of calculating all the additional hierarchical levels, this algorithm is used only to reduce the search space for the following two levels. Therefore, before applying the HSA algorithm on the two sequences X and Y, the Shrink(•) operation is applied. Then, the expanded path output p is used from the first instance of HSA and passed as masks to keyframe matching. A binary mask is shown on the right side of FIG. 3, where the white region defines the search space.

Further, a relatively accurate estimate of the final alignment path is created using keyframe matching (S304).

Figure 5:
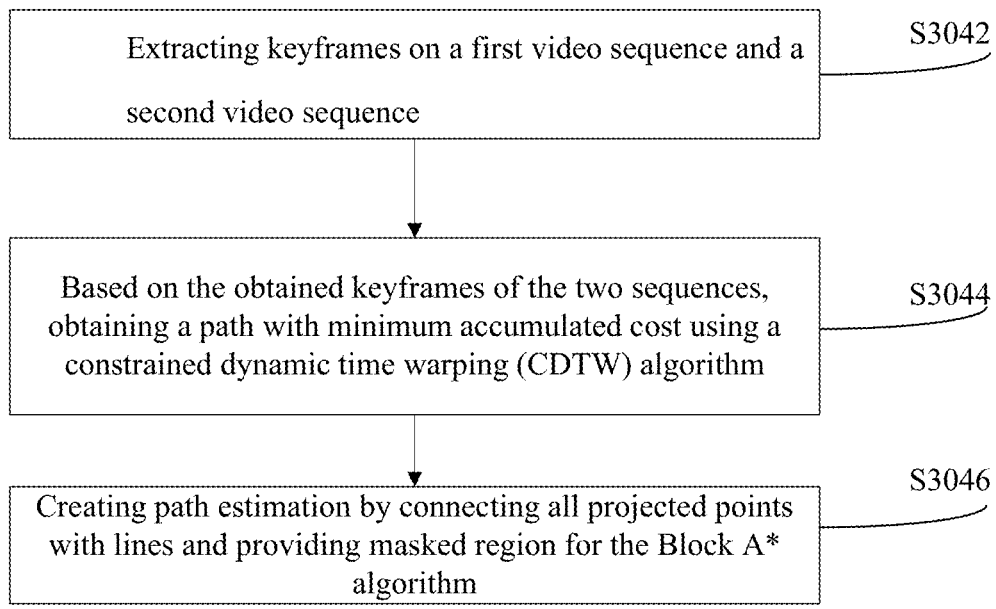
FIG. 5 illustrates a flow chart of an exemplary keyframe matching process consistent with the disclosed embodiments.

FIG. 5 illustrates a flow chart of an exemplary keyframe matching process consistent with the disclosed embodiments. As shown in FIG. 5, at the beginning, keyframes on the two video sequences are extracted (S3042).

First, to extract the keyframes from the time sequence $X=[x_1, x_2, \ldots x_N]$, the differential $dX=[dx_1, dx_2, \ldots dx_{N}-1]$ is calculated. The elements of dX are calculated by:

$$dx_n = |x_{n+1} - x_n| \quad (6)$$

Then, the shot detection method is applied on dX to identify the beginning and the end of every scene in the video.

Finally, the first and the last local minimum of dX in each scene are selected as the keyframe. The beginning and the end of scenes can be detected very reliably due to the big changes in the consecutive frames. Even with highly degraded movies, the scene changes always are at the same positions. The same keyframes with high accuracy are always selected by choosing those scene changes as reference points, no matter how degraded the video is. On the other hand, choosing local minima as keyframes means that neighboring frames have the least possible changes towards the keyframe, which makes the keyframe extraction error-tolerant and therefore robust.

Based on the obtained keyframes of the two sequences, a path with minimum accumulated cost is obtained using a constrained dynamic time warping (CDTW) algorithm (S3044).

From the obtained keyframes of the two sequences, the two new sequences $X_k=[x_{k1}, x_{k2}, \ldots x_{kN_k}] \in \mathbb{R}^{1 \times M_k}$, and $Y_k=[y_{k1}, y_{k2}, \ldots y_{kM_k}] \in \mathbb{R}^{1 \times N_k}$ are defined, where $x_{kn}$ and $y_{km}$ are the keyframes from X and Y, and $N_k$ and $M_k$ are the number of keyframes. Then, the two sequences are aligned. A modified sequential alignment algorithm that has different constraints and no need of a manually defined penalty function is used. For $M_k \leq N_k$, the recursive Formula 7 is described in $$g(n, m) = \begin{cases} d(n, m), & \text{if } m = 1 \\ d(n, m) + \min_{i=1 \ldots n} \{g(i, m-1)\}, & o.w. \end{cases} \quad (7)$$

The complexity of this Formula 7 is $O(M_k N_k^2)$. But if the minimum function is represented by:

$$\min_{i=1 \ldots n} \{g(i, m-1)\} = \min\left\{ \min_{i=1 \ldots n-1} \{g(i, m-1)\}, g(n, m-1) \right\} \quad (8)$$

Following from that, the same Formula can be used as shown in Algorithm 3, which is much more efficient and reduces the complexity to $O(M_k N_k)$.

Algorithm 3: Constraint Dynamic Time Warping (CDTW)

```
    Data: empty OpenSet
1   for n=1 to N do
2   |       g(n,1) = d(n,1)
3   end
4   for m=1 to M do
5   |       g(1,m) = d(1,m)
6   end
7   for m=2 to M do
8   |       minCost = g(1,m-1)
9   |       for n=2 to N do
10  |       |       minCost = min(g(n,m-1),minCost) g(n,m) =
    |       |               d(n,m) + minCost
11  |       end
12  end
```

Path estimation is created by connecting all projected points with lines and providing masked region for the Block A* algorithm (S3046).

Figure 6:
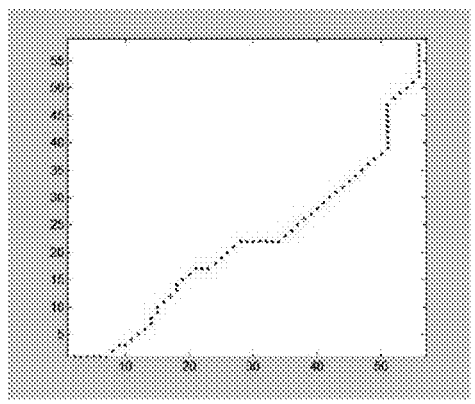
FIG. 6a-6f illustrate an exemplary path estimation with keyframes consistent with the disclosed embodiments.
Figure 6:
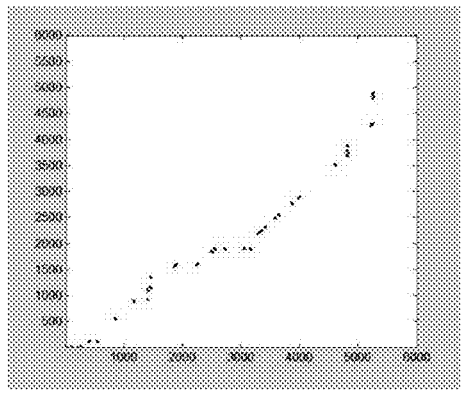
Figure 6:
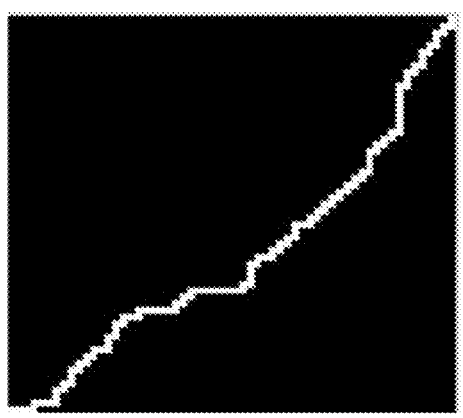
Figure 6:
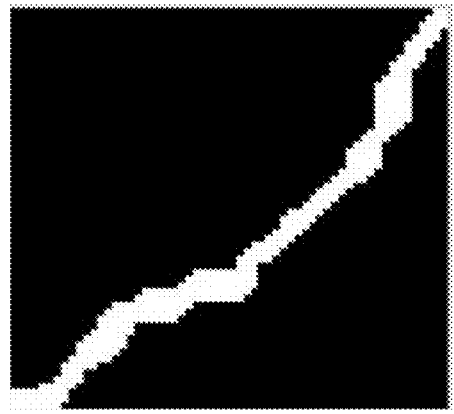
Figure 6:
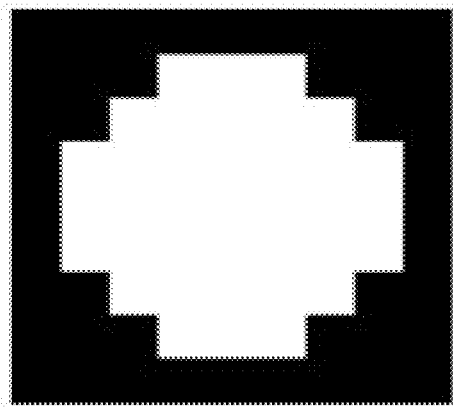
Figure 6:
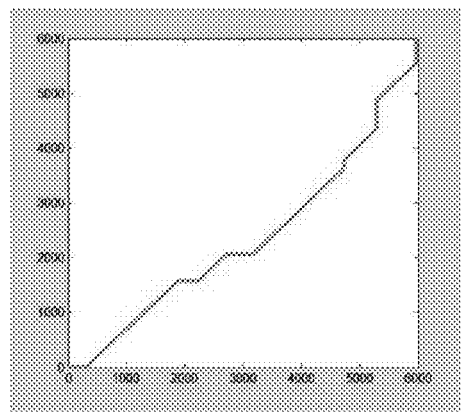

The obtained path is projected back on the original cost matrix. FIGS. 6a-6f illustrate an exemplary path estimation with keyframes consistent with the disclosed embodiments. FIG. 6a illustrates an exemplary constrained DTW on keyframes consistent with the disclosed embodiments. The path is a monotonically increasing curve. FIG. 6b illustrates an exemplary mapping of keypoints from the keyframe sequence cost matrix to the full sequence cost matrix consistent with the disclosed embodiments. FIG. 6c illustrates an exemplary extended line with structure elements consistent with the disclosed embodiments. As shown in FIG. 6c, path estimation is created by connecting all the projected points with lines. Then, the line with a morphological opening operation is extended, which is called opening. FIG. 6d illustrates an exemplary path after the extension with the structure elements consistent with the disclosed embodiments. The white region defines the search space. After using the keyframe matching, the search space for the alignment path can be limited to a relatively narrow band.

FIG. 6e illustrates an exemplary structure element consistent with the disclosed embodiments. As shown in FIG. 6e, a structure element approximates a circle. The diameter of the structure element depends on the direction of the line. The scaling factor $f_{i-1,i}$ for the line between a keypoint i−1 and i of the structure element is calculated by:

$$f_{i-1,i} = \frac{C}{\left(\frac{v_{i-1,i}}{\|v_{i-1,i}\|} * \frac{u}{\|u\|}\right)^2}, \tag{9}$$

where C is a constant which regulates the uncertainty in the path estimation, and $v_{i-1,i}$ is the vector from the keypoint i−1 to i. Assuming that the optimal path lies somewhere inside this area, this result is used to create a mask for the Block A* algorithm in S305.

Specifically, the Block A* algorithm only considers the masked region as a valid region for the path. The time and memory complexity of the Block A* algorithm can be reduced to O(M+N). A binary mask is shown on the right side of FIG. 3, where the white region defines the search space. In a certain case, the masked region needs to be calculated, which size is limited by the maximum path length and the maximum size of the structure element.

A correct alignment within the search space with the highest possible accuracy may be found using the Block A* algorithm (S305).

Algorithm 4: Block A* Algorithm

```
    Data: empty OpenSet
1       divide matrix in blocks
2       evaluate Start block
3       calculate ĝ-score and f-score of Start block
4       add Start block to OpenSet
5       while OpenSet is not empty do
6           get block with lowest f-score from OpenSet
7           remove block from OpenSet
8           if block == Goal then
9               exit
10          else
11              for each neighbor block do
12                  if block was already evaluated then
13                      update block
14                  else
15                      evaluate block
16                  end
17                  evaluate block calculate new ĝ-score and f-score
18                  if block is in OpenSet AND new ĝ-score is
                        lower than existing ĝ-score then
19                      update block-score in OpenSet
20                  else
21                      add block to OpenSet
22                  end
23              end
24          end
25      end
```

As shown in Algorithm 4, at the beginning, a cost matrix is divided into blocks. By building blocks of the size B×B, the maximal length of the open list priority queue is reduced by factor $B^2$, which results in a significant speed boost.

When calculating the cost matrix D and the optimal path cost matrix G, these matrices are stored in the memory. For the alignment of two 2 hr movies with 30 fps, a matrix with 216'000×216'000 elements is stored. For example, for 4 bytes per element, a full matrix is stored in the memory usage of about 174 GB. In the Block A*, blocks can be treated as independent units and be stored, that are evaluated by the Block A*.

In a case scenario, all the blocks of the mask are evaluated, which would lead to (N+M)×øSE×B nodes, where øSE is the maximal diameter of the structure element. For a block size of 100×100 nodes and øSE=10, this leads to an upper bound for memory usage of (216'000+216'000)*10*100*4 Bytes or about 1.6 GB, which is more than 100× smaller.

The single blocks are evaluated according to the normal SA formulation shown in Formula 4. After a start block is evaluated, from the start block, an OpenSet maintains a priority queue of blocks to be traversed. The lower f-score value for a given block, the higher its priority. At each step of the Block A* algorithm, the block with the lowest f-score value is removed from the queue, the ĝ-score and f-score values of its neighbors are updated accordingly, and these neighbors are added to the queue. The algorithm continues until a goal block has a lower f-score value than any block in the queue (or until the queue is empty). On the block-level, one g-score value and one f-score value per block are calculated by:

$$f(n,m)=g(n,m)+h(n,m) \tag{10}$$

where g(n,m) is the accumulated cost calculated in Formula 3, and h(n,m) is the heuristic cost for a residual path from a current position to a goal. The A* Algorithm can find the minimal alignment path, as long as the heuristic cost function is admissible. An admissible heuristic means that the heuristic cost has to be equal or lower than the actual cost. That is, the heuristic cost must not overestimate the distance to the goal. The heuristic cost is dependent on the application.

Figure 7:
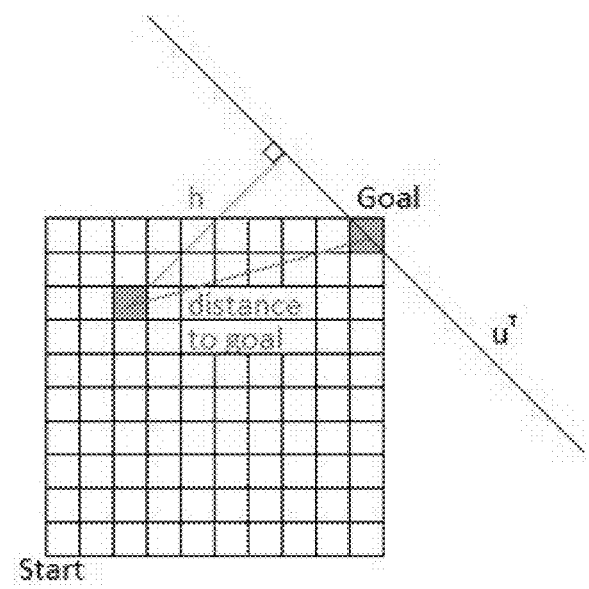
FIG. 7 illustrates an exemplary heuristic cost function consistent with the disclosed embodiments.

FIG. 7 illustrates an exemplary heuristic cost function consistent with the disclosed embodiments. As shown in FIG. 7, a new heuristic function, that promotes diagonal movements, is defined as a distance of a current position to a line $u^T$, where $u^T$ is perpendicular to the diagonal.

When the projection of the distance to a goal onto the unit vector along the diagonal line, the distance h is calculated by:

$$h(n, m) = \frac{((N, M) - (n, m)) * u}{\|u\|} H, \quad (11)$$

where H is a constant heuristic cost factor that is dependent on the input data. It represents the minimum cost per node. The diagonal unit vector $$\frac{u}{\|u\|}$$

can be calculated as $$\left(\frac{1}{\sqrt{2}}, \frac{1}{\sqrt{2}}\right).$$

Formula 11 can be written as:

$$h(n, m) = ((N, M) - (n, m)) * \left(\frac{1}{\sqrt{2}}, \frac{1}{\sqrt{2}}\right) * H. \quad (12)$$

The heuristic cost function may be also calculated by the following method. In order for the Block A* algorithm to be optimal, a heuristic cost function should be admissible. The lowest possible cost for a diagonal movement is 0. The cost for nondiagonal movement is given in Formula 4 as W. Therefore, a lower bound for the total alignment cost is calculated by:

$$\text{minCost} = \text{abs}(N-M) * W, \quad (13)$$

where N and M are the sequence length.

The same method can be applied to any node in the matrix, and an admissible heuristic cost is defined by:

$$h(n,m) = \text{abs}((N-n)-(M-m)) * W \quad (14)$$

where N and M are the sequence length.

Figure 8:
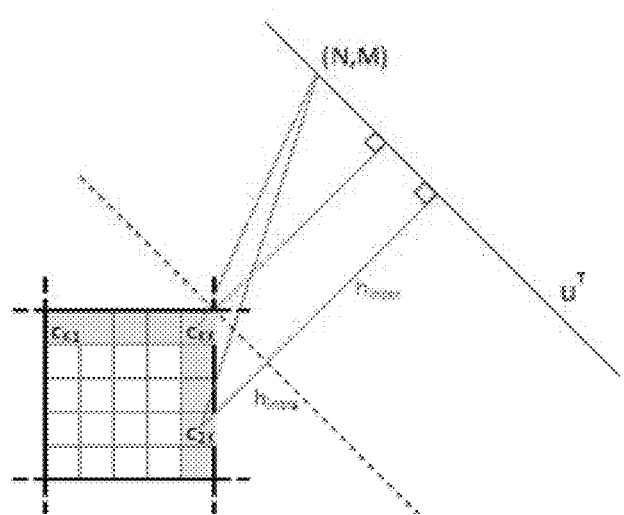
FIG. 8 illustrates an exemplary ĝ-score calculation consistent with the disclosed embodiments.

FIG. 8 illustrates an exemplary ĝ-score calculation for consistent with the disclosed embodiments. The A* algorithm only saves one value for the ĝ-score of a block, which represents the best possible case. The f-score for an individual node is given as $f(n,m) = g(n,m) + h(n,m)$, where $h(n,m)$ can be expressed by:

$$h(n,m) = h_{inter}(n,m) + h_{intra}(n,m) \quad (15)$$

where $h_{intra}$ represents the heuristic cost from the current node to the end of the block, and $h_{inter}$ represents the heuristic cost from the upper right block corner to the goal. The later one is constant for all nodes of the block and can be calculated with Formula 12 or 14. Let denote $c_{Ki}$ as the node in the top row and ith column and $c_{jK}$ as the node in the right most column and the jth row of the current block. Then, $h_{intra}$ can be calculated by:

$$h\text{intra}(K,i) = (K-i) * W \quad (16)$$

$$h\text{intra}(j,K) = (K-j) * W \quad (17)$$

The value for the ĝ-score for the current block is calculated by:

$$\hat{g} = \min\{g(K,i) + h_{intra}(K,i), i=1\ldots K\ g(K,K),\ g(j,K) + h_{intra}(j,K), j=1\ldots K\} \quad (18)$$

The block f-score is calculated by:

$$f = h_{inter} + \hat{g} \quad (19)$$

where $h_{inter}$ represents the heuristic cost from the upper right block corner to the goal, and ĝ represents value for the ĝ-score for the current block.

Based on the obtained ĝ-score and f-score, the evaluated block is updated. A final alignment result is outputted after applying the Block A* algorithm to the search region (S306).

Figure 9:
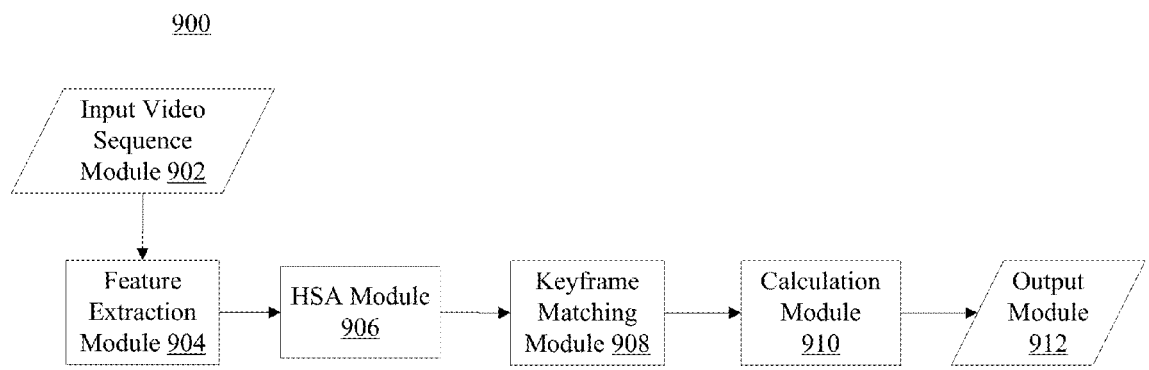
FIG. 9 illustrates a structure diagram of an exemplary apparatus for video sequential alignment consistent with the disclosed embodiments.

FIG. 9 illustrates a structure diagram of an exemplary apparatus for video sequential alignment consistent with the disclosed embodiments. As shown in FIG. 9, apparatus 900 includes an input video sequence module 902, a feature extraction module 904, a hierarchical sequential alignment (HSA) module 906, a keyframe matching module 908, a calculation module 910, and an output module 912. Certain components may be omitted and other components may be added.

The input video sequence module 902 is configured to provide two video sequences from any appropriate type of source for video contents. The contents from the input video sequence module 902 may include both video data and metadata. Plurality of frames may be associated with the video content and may be provided to other modules for processing.

The feature extraction module 904 is configured to extract the feature vectors of the two input video sequences. The feature extraction module 904 extracts the features from every frame of two videos X and Y. Every feature can be vectorized to a constant length vector.

The hierarchical sequential alignment (HSA) module 906 is configured to generate an expanded path using a hierarchical sequential alignment algorithm.

The keyframe matching module 908 is configured to generate masks containing search space. The keyframe matching module 908 may create a relatively accurate estimate of the final alignment path. The search space for the alignment path can be limited to a relatively narrow band.

The calculation module 910 is configured to calculate the lowest path cost within search space to find a minimal alignment path using a Block A* algorithm. The correct alignment may be found within the reduced search space with the highest possible accuracy based on the obtained heuristic cost and path cost per block.

The output module 912 is configured to output a final alignment result after applying the Block A* algorithm to the search region.

Figure 10:
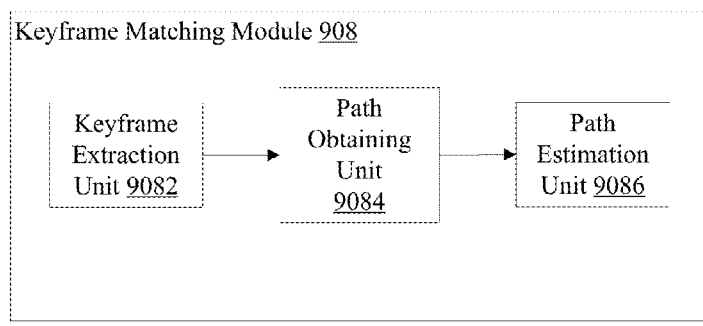
FIG. 10 illustrates a structure diagram of an exemplary keyframe matching module consistent with the disclosed embodiments.

FIG. 10 illustrates a structure diagram of an exemplary keyframe matching module consistent with the disclosed embodiments. As shown in FIG. 10, the keyframe matching module 908 may include a keyframe extraction unit 9082, a path obtaining unit 9084 and a path estimation unit 9086.

The keyframe extraction unit 9082 is configured to extract keyframes on the two video sequences. The keyframe extraction unit 9082 selects the first and the last local minimum of the differential of the time sequences as keyframes in each scene.

The path obtaining unit 9084 is configured to, based on the obtained keyframes of the two sequences, obtain a path with minimum accumulated cost using a constrained dynamic time warping (CDTW) algorithm.

The path estimation unit 9086 is configured to, based on the obtained path, create path estimation by connecting all the projected points with lines and pass the masked region to the calculation module 910.

Specifically, the Block A* algorithm only considers the masked region as a valid region for the path.

Those skilled in the art should understand that all or part of the steps in the above method may be executed by relevant hardware instructed by a program, and the program may be stored in a computer-readable storage medium such as a read only memory, a magnetic disk, a Compact Disc (CD), and so on.

The embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. A method for video sequential alignment, comprising:
    inputting a first video sequence and a second video sequence;
    extracting features of the first video sequence and the second video sequence;
    generating an expanded path using a hierarchical sequential alignment algorithm;
    generating masks containing search space using keyframe matching;
    calculating the lowest path cost within search space to find a minimal alignment path using a block A* algorithm; and
    outputting a final alignment result after applying the block A* algorithm to search space;
    wherein calculating the lowest path cost within search space to find a minimal alignment path using a block A* algorithm further includes:
        dividing a cost matrix into blocks, therein a first dimension of the cost matrix represents the features extracted from the first video sequence, and a second dimension of the cost matrix represents the features extracted the second video sequence;
        evaluating each block within the search space;
        calculating heuristic cost function per block, wherein the heuristic cost function promotes diagonal movement;
        calculating accumulated optimal path cost per block; and
        updating the evaluated block.

2. The method according to claim 1, wherein calculating the lowest path cost within search space to find a minimal alignment path using a block A* algorithm further includes:
    dividing a cost matrix into blocks;
    evaluating each block;
    calculating heuristic cost function per block;
    calculating optimal path cost per block; and
    updating the evaluated block.

3. The method according to claim 2, wherein:
    the heuristic function that promotes diagonal movements is defined as a distance of a current position to a line $u^T$, wherein $u^T$ is perpendicular to the diagonal; and
    the heuristic cost function is defined by:

$$h(n, m) = \frac{((N, M) - (n, m)) * u}{\|u\|} H,$$

wherein H is a constant heuristic cost factor that is dependent on input data;

$$\frac{u}{\|u\|}$$

is a diagonal unit vector; N and M are the dimension of the cost matrix; n and m are indexes from the two video sequences, respectively.

4. The method according to claim 2, wherein:
an admissible heuristic cost is also defined by:

$$h(n,m) = \text{abs}((N-n)-(M-m)) * W$$

wherein N and M are the sequence length; the cost for nondiagonal movement W is a constant penalty; and n and m are indexes from the two video sequences, respectively.

5. The method according to claim 2, wherein:
the A* algorithm only saves one accumulated optimal path cost $\hat{g}$-score of a block; and
the path cost of the block is calculated by:

$$f = h_{inter} + \hat{g}$$

wherein $h_{inter}$ represents the heuristic cost from an upper right block corner to a goal, and $\hat{g}$ represents a value for the $\hat{g}$-score of a current block.

6. The method according to claim 1, wherein generating an expanded path using a hierarchical sequential alignment algorithm further includes:
    extracting keyframes on the first video sequence and the second video sequence;
    based on the obtained keyframes of the two video sequences, obtaining a path with minimum accumulated cost using a constrained dynamic time warping (CDTW) algorithm; and
    creating path estimation by connecting all projected points with lines and providing masked region for the block A* algorithm.

7. The method according to claim 6, wherein:
after creating path estimation by connecting all projected points with lines, the extended path is obtained by performing a morphological opening operation to the created path.

8. The method according to claim 6, wherein the CDTW algorithm does not include a manually defined penalty.

9. The method according to claim 1, wherein:
the path cost of the block is calculated by adding the accumulated optimal past cost of the block and a heuristic cost from an upper right block corner to a goal.

10. The method according to claim 1, wherein
the heuristic function that promotes diagonal movements is defined as a distance of a current position to a line $u^T$, wherein $u^T$ is perpendicular to the diagonal; and
the heuristic cost function is defined by:

$$h(n, m) = \frac{((N, M) - (n, m)) * u}{\|u\|} H,$$

wherein H is a constant heuristic cost factor that is dependent on input data;

$$\frac{u}{\|u\|}$$

is a diagonal unit vector; N and M are the dimension of the cost matrix; n and m are indexes from the two video sequences, respectively.

11. A method for video sequential alignment, comprising:
inputting a first video sequence and a second video sequence;
extracting features of the first video sequence and the second video sequence;
generating an expanded path using a hierarchical sequential alignment algorithm;
generating masks containing search space using keyframe matching;
calculating the lowest path cost within search space to find a minimal alignment path using a block A* algorithm; and
outputting a final alignment result after applying the block A* algorithm to search space;
wherein generating an expanded path using a hierarchical sequential alignment algorithm further includes:
extracting keyframes on the first video sequence and the second video sequence;
based on the obtained keyframes of the two video sequences, obtaining a path with minimum accumulated cost using a constrained dynamic time warping (CDTW) algorithm; and
creating path estimation by connecting all projected points with lines and providing masked region for the block A* algorithm;
wherein extracting keyframes on the two video sequences further includes:
calculating differential dX and dY of the two video sequences $X=[x_1,x_2,\ldots x_N]$ and $Y=[y_1,y_2,\ldots y_M]$, wherein N and M are length of the two video sequences X and Y;
identifying a beginning and an end of every scene by applying a shot detection method on dX and dY; and
selecting a first and a last local minimum of dX and dY in each scene as keyframes.

12. The method according to claim 11, wherein:
elements of the differential $dX=[dx_1,dx_2,\ldots dx_{N-1}]$ are calculated by:

$$dx_n=|x_{n+1}-x_n|,$$

wherein n is an integer between 1 and N−1; and
elements of the differential $dY=[dy_1,dy_2,\ldots dy_{M-1}]$ are calculated by:

$$dy_m=|y_{m+1}-y_m|,$$

wherein m is an integer between 1 and M−1.

13. The method according to claim 11, wherein creating path estimation by connecting all projected points with lines and providing masked region for the block A* algorithm further includes:
calculating a scaling factor $f_{i-1,i}$ for line between a keypoint i−1 and i of a structure element by:

$$f_{i-1,i}=\frac{C}{\left(\frac{v_{i-1,i}}{\|v_{i-1,i}\|}*\frac{u}{\|u\|}\right)^2},$$

wherein C is a constant which regulates uncertainty in the path estimation;

$$\frac{u}{\|u\|}$$

is a diagonal unit vector; i is an integer; and $v_{i-1,i}$ is a vector from the keypoint i−1 to i.

14. An apparatus for video sequential alignment, comprising:
an input video sequence module configured to provide two video sequences from any appropriate type of source for video contents;
a feature extraction module configured to extract the feature vectors of the first video sequence and the second video sequence;
a hierarchical sequential alignment (HSA) module configured to generate an expanded path using a hierarchical sequential alignment algorithm;
a keyframe matching module configured to generate masks containing search space;
a calculation module configured to calculate the lowest path cost within search space to find a minimal alignment path using a block A* algorithm; and
an output module configured to output a final alignment result after applying the block A* algorithm to the search space;
wherein the keyframe matching module further includes:
a keyframe extraction unit configured to extract keyframes on the first video sequence and the second video sequence;
a path obtaining unit configured to, based on the obtained keyframes of the two video sequences, obtain a path with minimum accumulated cost using a constrained dynamic time warping (CDTW) algorithm; and
a path estimation unit configured to, based on the obtained path, create path estimation by connecting all the projected points with lines and pass masked region to the calculation module;
wherein the keyframe extraction unit is further configured to:
calculate differential dX and dY of the two video sequences $X=[x_1,x_2,\ldots x_N]$ and $Y=[y_1,y_2,\ldots y_M]$, wherein N and M are length of the two video sequences X and Y;
identify a beginning and an end of every scene by applying a shot detection method on dX and dY; and
select a first and a last local minimum of dX and dY in each scene as keyframes.

15. The apparatus according to claim 14, wherein:
elements of the differential $dX=[dx_1,dx_2,\ldots dx_{N-1}]$ are calculated by:

$$dx_n=|x_{n+1}-x_n|,$$

wherein n is an integer between 1 and N−1; and
elements of the differential $dY=[dy_1,dy_2,\ldots dy_{M-1}]$ are calculated by:

$$i\,dy_m=|y_{m+1}-y_m|,$$

wherein m is an integer between 1 and M−1.

16. The apparatus according to claim 14, wherein:

calculating a scaling factor $f_{i-1,i}$ for the line between a keypoint i−1 and i of a structure element by:

$$f_{i-1,i} = \frac{C}{\left(\frac{v_{i-1,i}}{\|v_{i-1,i}\|} * \frac{u}{\|u\|}\right)^2},$$

wherein C is a constant which regulates uncertainty in the path estimation;

$$\frac{u}{\|u\|}$$

is a diagonal unit vector; i is an integer; and $v_{i-1,i}$ is a vector from the keypoint i−1 to i.

17. The apparatus according to claim 14, wherein:

a cost matrix is divided into blocks;

each block is evaluated;

heuristic cost function per block is calculated;

optimal path cost per block is calculated; and the evaluated block is updated.

18. The apparatus according to claim 17, further including:

the heuristic function that promotes diagonal movements is defined as a distance of a current position to a line $u^T$, wherein $u^T$ is perpendicular to the diagonal; and the heuristic cost function is defined by:

$$h(n,m) = \frac{((N,M)-(n,m))*u}{\|u\|}H,$$

wherein H is a constant heuristic cost factor that is dependent on input data;

$$\frac{u}{\|u\|}$$

is a diagonal unit vector; N and M are the dimension of the cost matrix; n and m are indexes from the two video sequences, respectively.

19. The apparatus according to claim 17, wherein:

an admissible heuristic cost is also defined by:

$$h(n,m) = \text{abs}((N-n)-(M-m))*W$$

wherein N and M are the sequence length; the cost for nondiagonal movement W is a constant penalty; and n and m are indexes from the two video sequences, respectively.

20. The apparatus according to claim 17, wherein:

the A* algorithm only saves one accumulated optimal path cost $\hat{g}$-score of a block; and the path cost of the block is calculated by:

$$f = h_{inter} + \hat{g}$$

wherein $h_{inter}$ represents the heuristic cost from an upper right block corner to a goal, and $\hat{g}$ represents a value for the $\hat{g}$-score of a current block.

* * * * *